Patented Feb. 5, 1952

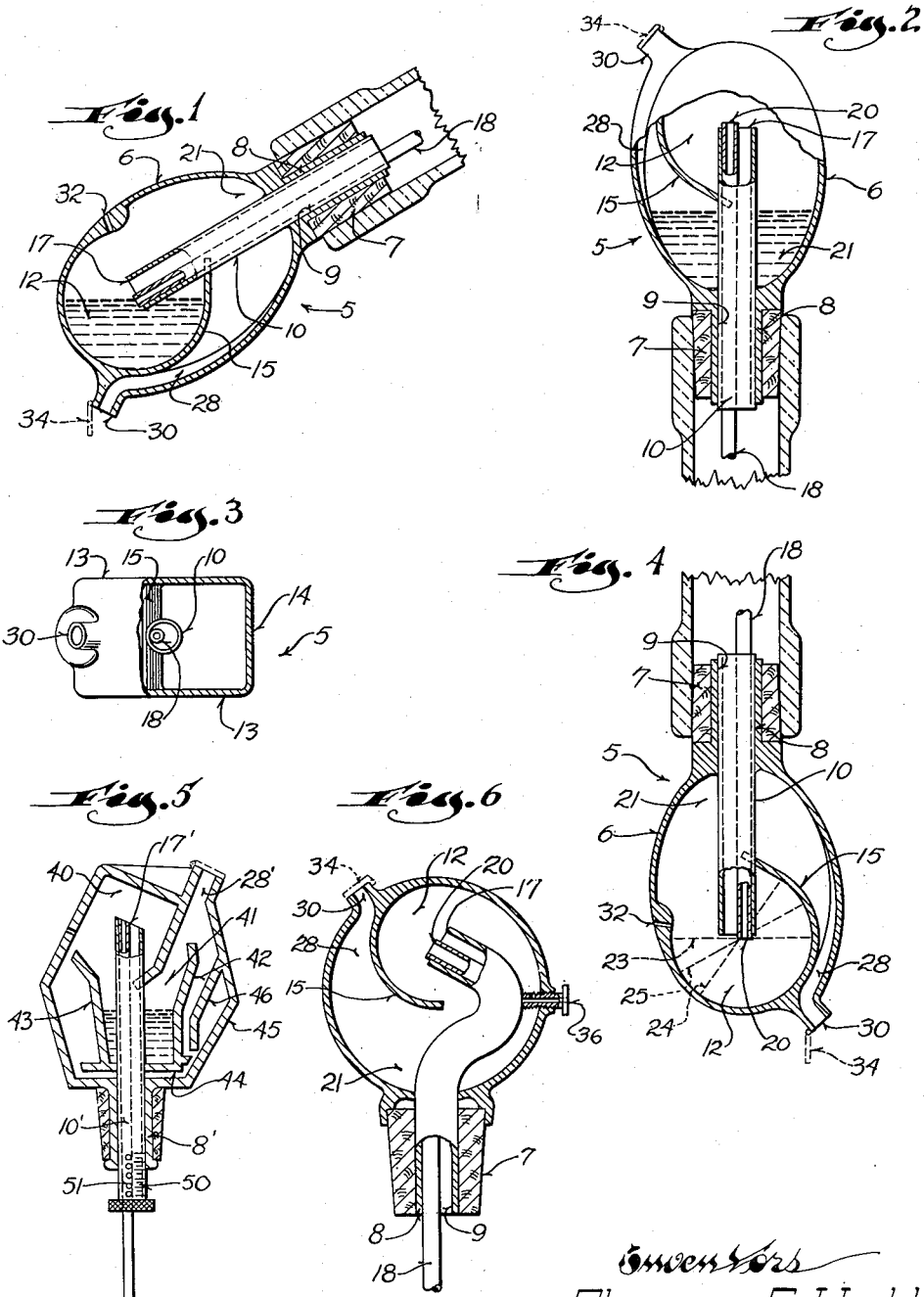

2,584,130

UNITED STATES PATENT OFFICE 2,584,130

CONTAINER WITH TRAP CHAMBER OPERATED BY TIPPING

Clarence G. Huebl, Milwaukee, and Henry P. Buerosse, Pewaukee, Wis.

Application August 1, 1946, Serial No. 687,752

3 Claims. (Cl. 222—455)

This invention relates to dispensing devices and refers more particularly to dispensers for liquids such as liquors and the like.

Dispensers generally used for this purpose are provided with a neck by which they are mounted on the mouth of a bottle to have all of the liquor dispensed from the bottle pass therethrough. For the most part, these past dispensers have been designed chiefly to act as pouring spouts through which the liquor could be dispensed slowly without spilling and waste.

Recently there has been some appreciation of the desirability of providing a dispenser having in addition to the aforementioned function the ability to dispense a predetermined measured quantity of liquid upon tilting of the bottle to carry the dispenser toward an inverted dispensing position. It is this latter type of "automatic" dispenser with which the present invention is chiefly concerned.

Although several attempts have been made to provide an "automatic" dispenser capable of dispensing a predetermined measured quantity of liquid, such dispensers have heretofore never enjoyed widespread use. Perhaps the chief reason for this failure was their inability to dispense the same measured amount of liquid each time used unless extreme care was taken to tilt the bottle upon which they were mounted to exactly the same angle during the dispensing act.

With this objection to past dispensing devices in mind, it is one of the objects of this invention to provide an improved dispensing device of the "automatic" type by which the same amount of liquor is dispensed each time it is desired to dispense a drink regardless of the angle to which the device is tilted during the dispensing act.

Another object of this invention resides in the provision of a dispensing device of the character described which may be adjusted to deliver different predetermined amounts of liquid.

More specifically, it is an object of the present invention to provide a dispensing device of the automatic type having a measuring chamber in its interior to initially receive the liquid from the bottle and so designed and related to the inlet end of the vent tube which opens thereinto that a predetermined minimum amount of liquid delivered to the measuring chamber acts to seal off the inlet to the vent tube and thereby effect cessation of the flow of liquid into the measuring chamber after delivery of said predetermined amount of liquid thereto regardless of the angle to which the device is tilted toward inverted dispensing position.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates several complete examples of the physical embodiments of the invention constructed according to the best modes so far devised for the practical application of the principles thereof, and in which:

Figure 1 is a longitudinal sectional view through the dispensing device of this invention illustrating the same in place on the mouth of a bottle, and with the device tilted to a dispensing position in which liquid is transferred from the bottle to the measuring chamber during the actual dispensing act;

Figure 2 is a view similar to Figure 1 showing the dispensing device in its upright position with the liquid measured out in the measuring chamber transferred into the dispensing chamber in readiness for discharge from the device;

Figure 3 is a top view looking down on the dispenser shown in Figure 2 and having a portion thereof broken away to illustrate its interior construction;

Figure 4 is a diagram illustrating the relationship between the shape of the measuring chamber and the inlet end of the vent tube therein by which a predetermined minimum amount of liquid is delivered into the measuring chamber each time the device is tilted toward dispensing position;

Figure 5 is a longitudinal sectional view of a dispensing device of slightly modified construction; and Figure 6 is a longitudinal sectional view through a still further modified dispensing device.

Referring now more particularly to the accompanying drawing in which like numerals indicate like parts, the numeral 5 designates the preferred dispensing device of this invention. The dispenser herein shown comprises a hollow body 6 having an adapter 7 such as a cork insertable into the open mouth of a bottle whose contents are to be dispensed to mount the device in an upright position on the bottle as shown in Figure 2.

It will be readily understood that the mounting adapter 7 may also be provided with internal threads to engage over the threaded neck of a bottle to mount the device thereon.

In either event the lower portion of the body is provided with a neck 8 having a bore 9 therethrough to communicate the interior of the bottle with the hollow interior of the dispensing device. In the present instance the cork is shown telescoped over the neck 8.

Liquid is conducted from the interior of the bottle into the interior of the dispensing device by means of a filler tube 10 received in the bore 9 and of a size to snugly and frictionally engage the walls of the bore so as to be firmly held in place thereby but to enable axial adjustment of the tube into and out of the body.

The lower portion of the tube may terminate adjacent to the bottom of the cork as shown in Figures 1 and 2 so as to facilitate dispensing of the entire contents of the bottle but its inner end projects substantially longitudinally through the hollow interior of the body and terminates near the upper end of the body in a measuring chamber 12.

The measuring chamber is formed jointly by the opposite side walls 13 of the body, which in the present instance are shown as substantially flat and parallel to one another, by portions of the substantially continuous end wall 14 of the body which joins the marginal edges of the side walls, and by a substantially circular extension 15 of the end wall 14 curving inwardly into the body from the top thereof to act as a transverse baffle or partition.

The side walls 13 have a substantially oval or elliptical shape as clearly shown in Figures 1 and 2 so that the partition 15 and the upper portions of the end wall 14 form a substantially circular bottom for the measuring chamber. It is particularly important to note that the measuring chamber 12 in the upper end of the body be of substantially "regular" shape.

In the present instance the chamber is circular in longitudinal cross section, but a spherical, rectangular or any other "regularly" shaped chamber will serve the same purpose. With a predetermined amount of liquid in the measuring chamber having one of the shapes defined, the surface of the liquid always has the same area regardless of the angle to which the device is tilted for dispensing.

Hence, a predetermined minimum amount of liquid in the measuring chamber is capable of closing off the inlet end 17 of a vent tube 18 fixed inside the filler tube 10 provided that said inlet end of the vent tube is located substantially centrally of the measuring chamber as shown. Inasmuch as the vent tube has its opposite end portion 20 projecting from the neck 8 for insertion into the interior of the bottle, it follows that liquid will flow through the filler tube 10 into the measuring chamber in the tilted dispensing position of the device as long as air from the interior of the dispensing device flows through the vent tube into the bottle to displace liquid flowing therefrom.

When the level of liquid delivered to the measuring chamber rises to a point just sufficient to submerge the inlet end 17 of the vent tube the flow of liquid through the filler tube 10 into the measuring chamber ceases and a measured amount of liquid is retained in the measuring chamber for transfer into the lower portion of the body 21 which constitutes a dispensing chamber after return of the dispensing device to its upright position indicated in Figure 2.

The transfer of liquid from the dispensing chamber to the measuring chamber is possible by reason of the fact that these chambers are in open communication with one another with the partition wall 15 having its lower extremity spaced from the end wall 14 of the body and inclined downwardly toward the bottom of the device.

The diagram of Figure 4 illustrates that by reason of the "regular" shape of the measuring chamber and the predetermined position of the inlet end of the vent tube with relation thereto, that a predetermined minimum amount of liquid delivered to the measuring chamber at substantially any dispensing angle of the device has its surface always in a position to just close off the inlet end of the vent tube.

The construction line designated 23 in Figure 4 indicates the level of liquid in the measuring chamber if the device is inverted with the bottle tilted through an angle of 180°; the construction line 24 indicates the level of liquid measured into the chamber 12 at the angle of least tilt at which the dispensing device is capable of dispensing liquid from the chamber 21; and the numeral 25 designates the level of liquid measured into the chamber 12 when the device has been tilted to a dispensing angle representing normal dispensing position usually employed by most operators of dispensers of this character.

At all three angles of tilt it will be seen that the level of the minimum amount of liquid capable of sealing off the inlet end of the vent tube to terminate flow of liquid into the measuring chamber passes directly through the center of the substantially circular measuring chamber. Hence, the quantity of liquid is the same for all three conditions illustrated.

It will also be apparent that in the event the measuring chamber is substantially cylindrical in shape or one having a substantially rectangular cross section it is only necessary that the inlet end portion of the vent tube be located centrally of the chamber and on its longitudinal axis.

The partition wall 15 is spaced slightly from the end wall of the body remote from the passageway communicating the measuring and dispensing chambers but cooperates with said wall to provide a discharge passageway 28 leading from the dispensing chamber 21. The passageway 28 continues upwardly along the exterior of the partition wall 15 and terminates in a pouring spout or nozzle 30 at the upper portion of the body.

Attention is directed to the fact that the cross sectional area of the discharge passageway 28 at least adjacent to the nozzle 30 is less than the effective cross sectional area of the filler tube 10. In other words, the space inside the filler tube 10 surrounding the vent tube 18 must be so related to the cross sectional area of the discharge passageway as to enable the measuring chamber 12 to be filled to a level just closing off the inlet end of the vent tube prior to complete dispensing of the liquid contained in the chamber 21 during tilting of the device toward its inverted dispensing position. With these parts so related to one another delivery of the desired predetermined quantity of liquid into the measuring chamber is assured.

For the purpose of supplying air to the interior of the body during use of the device a vent opening 32 is provided in the wall 14 at a distance sufficiently beneath the top of the body as to preclude liquid in the measuring chamber from closing the same off or leaking therethrough with the device in an inverted position.

If desired, the device may be equipped with a hinged cap illustrated in construction lines at 34 to close the discharge nozzle 38 in the upright position of the dispenser but to swing open as indicated in Figure 1 during dispensing to freely permit liquid to flow out of the device.

While the vent tube 18 may be axially adjusted to vary the distance of its inlet end 17 from the bottom forming walls of the measuring chamber in the Figures 1 to 4 embodiment of the invention to enable variation of the amount of liquid dispensed, it is preferable that the inlet end of the vent tube remain substantially at the center of the circular measuring chamber for accuracy in the measuring and dispensing of a predetermined amount of liquid regardless of the dispensing angle employed.

The dispensing devices illustrated in Figures 5 and 6, however, are better suited for adjustment of their vent tubes to enable dispensing of different amounts of liquid.

In the Figure 6 embodiment, the vent and filler tubes have their inner end portions inside the body bent or curving around the lower extremity of the partition wall 15 to enter the measuring chamber centrally but at an angle such that the vent tube is substantially vertical when the device is tilted to the most common dispensing position midway between a 180° tilt and one representing the least angle of tilt at which dispensing is possible with the particular location of the pouring spout and discharge passage leading thereto.

A combined adjusting and vent screw 36 threaded through the end wall of the body adjacent to the bent portion of the filler tube bears thereagainst and it will be understood that inasmuch as the vent and filler tubes are provided with a degree of resiliency that turning of the adjusting screw 36 in and out of its threaded hole effects adjustment of the inlet end of the vent tube toward and from the bottom of the measuring chamber.

In the construction illustrated in Figure 5 the dispenser is provided with a measuring chamber 40 of substantially rectangular cross section. Also, the dispensing chamber 41 is formed jointly by the opposite sides of the body and by transverse partitions 42 and 43 extending substantially vertically transversely across the body. A bottom partition 44 joining the upright partition members completes the dispensing chamber.

The partition 42 lies substantially medially of the discharge passage 28' so as to define a space between it and the adjacent end wall 45 of the body. This space is adapted to contain any liquid which flows back into the body upon partial dispensing of the contents of the dispensing chamber and for this purpose a baffle-like partition 46 extending transversely across the interior of the body and joined to the end wall 45 is provided to prevent liquid trapped alongside the dispensing chamber from being dispensed during subsequent dispensing operations.

Any liquid trapped in this manner may be returned to the measuring chamber 40 for remeasuring along with fresh liquid from the bottle by tilting the device in an opposite direction from that customarily employed in the dispensing act so that the liquid flows along the space between the partition wall 43 and the adjacent end wall of the body.

Attention is directed to the fact that the inlet end 17' of the vent tube in this embodiment is disposed centrally of the measuring chamber and substantially on its longitudinal axis. Likewise the filler tube 10' projects a slightly greater distance outwardly of the neck 8' and has a series of marks 50 thereon which may be aligned with the bottom of the neck to indicate the adjustment of the vent tube and the quantity of liquid to be measured in the measuring chamber 40. The projecting end of the filler tube may be apertured as at 51 to facilitate complete dispensing of the contents of the bottle.

From the foregoing description taken in connection with the accompanying drawing, it will be readily apparent to those skilled in the art that this invention provides an improved dispensing device in which are combined the features of automatic dispensing of predetermined quantities of liquid regardless of the angle at which the device is tilted in the dispensing act and that of enabling adjustment of the amount of liquid to be dispensed.

What we claim as our invention is:

1. A dispensing device of the character described, comprising: a hollow body; means on the body for mounting the device in an upright position on the mouth of a bottle; a partition wall in the interior of the body defining a measuring chamber inside the upper portion thereof for holding a quantity of liquid in an inverted position of the device but communicated with the lower portion of the body to transfer its contents thereinto in the upright position of the device; a filler tube carried by the body for communicating the interior of the bottle with the measuring chamber; a vent tube carried by the body with its inlet end curved around said partition wall and facing the bottom of the measuring chamber substantially centrally thereof, said vent tube having a degree of resiliency whereby said curved inner end thereof is capable of flexure in a direction to carry said inlet end of the tube toward and from the bottom of the measuring chamber, and the curvature of the tube being such that the central relationship of the inlet end thereof in said measuring chamber is substantially retained despite flexure of the tube to carry its inlet end toward and from the bottom of the measuring chamber; and an adjusting screw threaded into the wall of the body adjacent to the bent inner end of the vent tube for flexing the same toward the bottom of the measuring chamber and for holding the inlet end of said tube in any of a number of different positions of adjustment with respect to the bottom of the measuring chamber.

2. A dispensing device of the character described, comprising: an upright hollow body having attaching means for mounting the device on the mouth of a bottle in an upright position thereon; a downwardly curved partition wall in the upper portion of the hollow interior of the body near one side thereof having its lower end portion curving inwardly toward the opposite side of the body but spaced therefrom to provide restricted communication between the upper and lower portions of the body, said curved partition wall cooperating with the wall portions of the body at the top thereof to define a substantially circular measuring chamber in the upper end of the body to hold a quantity of liquid in an inverted position of the device for transfer to the lower portion of the body in a nearly upright position of the device; a filler tube carried by the body and projecting inwardly through the attaching means thereon into the interior of the body and past the lower end portion of the partition wall to the measuring chamber to communicate the interior of the measuring chamber with the interior of the bottle; a vent tube carried by the body and likewise projecting inwardly through said attaching means and the interior of the body into the measuring chamber, to communicate the interior of the measuring chamber with the interior of the bottle, the open inlet end of the vent tube facing the bottom of said circular measuring chamber and being disposed on its center, and means on said first designated side of the body defining a discharge spout communicating with the lower portion of the body interior along the convex side of said partition wall.

3. A dispensing device of the character described, comprising: an upright hollow body having a pouring spout on the upper portion thereof at one side of the vertical axis of the body and attaching means on its lower end portion for mounting the body in an upright position on the mouth of a bottle, spout uppermost, so as to necessitate tilting of the device toward an inverted position with the pouring spout lowermost for dispensing liquids contained in the lower hollow portion of the body; a downwardly and inwardly curved partition wall within the upper portion of the body at said side thereof extending across the hollow interior of the body and having its lower end projecting substantially laterally crosswise of the body axis toward the other side of the body, said partition wall cooperating with the upper wall portions of the body to define a measuring chamber having a concave inner surface for holding a quantity of liquid in the inverted position of the device but communicated with the lower portion of the body along the entire length of said opposite side of the body to transfer its contents thereinto in an upright position of the device; a filler tube carried by the body and projecting through said attaching means into the measuring chamber to communicate it with the interior of the bottle; and a vent tube mounted on the body with its outlet end projecting downwardly through said attaching means and its inlet end extending upwardly alongside and past the lower end of the partition wall into the measuring chamber with the opening in the vent tube facing the bottom of the measuring chamber and disposed on its center of curvature so as to be as close as possible equidistant from all wall surfaces of the measuring chamber, whereby the amount of liquid necessary to close the open inlet end of the vent tube will always be substantially the same regardless of the angle to which the bottle is tilted to dispose the measuring chamber lowermost.

CLARENCE G. HUEBL.
HENRY P. BUEROSSE.

REFERENCES CITED

The following references are of record in the file of this patent:

FOREIGN PATENTS

| Number | Country | Date |
|---|---|---|
| 377,974 | Germany | June 30, 1923 |